United States Patent
Shimasaki et al.

[19]

[11] Patent Number: 6,020,697
[45] Date of Patent: Feb. 1, 2000

[54] HYBRID VEHICLE

[75] Inventors: Yuichi Shimasaki; Kenji Nakano; Hironao Fukuchi; Hideyuki Takahashi; Kazutomo Sawamura; Teruo Wakashiro, all of Wako, Japan

[73] Assignee: Honda Giken Kogyo Kabushiki Kaisha, Tokyo, Japan

[21] Appl. No.: 09/190,027

[22] Filed: Nov. 12, 1998

[30] Foreign Application Priority Data

Nov. 14, 1997 [JP] Japan .................................. 9-313047
Nov. 14, 1997 [JP] Japan .................................. 9-313049

[51] Int. Cl.[7] ...................................................... H02P 5/20
[52] U.S. Cl. ........................ 318/140; 180/65.3; 180/65.4; 318/139
[58] Field of Search .................................... 318/140–156, 318/139; 322/16; 180/65.4

[56] References Cited

U.S. PATENT DOCUMENTS

| | | | |
|---|---|---|---|
| 4,165,795 | 8/1979 | Lynch et al. ................................ 180/65 |
| 5,513,719 | 5/1996 | Moroto et al. ......................... 180/65.4 |
| 5,568,023 | 10/1996 | Grayer et al. ........................... 318/139 |
| 5,635,805 | 6/1997 | Ibaraki et al. ........................... 318/139 |
| 5,915,489 | 1/1999 | Yamaguchi ............................. 180/65.4 |
| 5,934,396 | 8/1999 | Kurita ..................................... 190/65.4 |
| 5,939,848 | 8/1999 | Yano et al. ............................. 318/139 |
| 5,942,879 | 8/1999 | Ibaraki ..................................... 322/16 |

*Primary Examiner*—Robert E. Nappi
*Assistant Examiner*—Rita Leykin
*Attorney, Agent, or Firm*—Armstrong, Westerman, Hattori, McLeland & Naughton

[57] ABSTRACT

A hybrid vehicle has a generator motor coupled to the output shaft of an engine through a transfer shaft, for transmitting an assistive output power for assisting an output power of the engine through the transfer shaft to the output shaft of the engine. A battery stores electric energy regenerated by the generator motor from kinetic energy of the hybrid vehicle transmitted from the output shaft of the engine through the transfer shaft. A generator is mounted on the transfer shaft and has an electric energy generating ability smaller than the generator motor. The generator generates electric energy to energize another device than the battery.

8 Claims, 7 Drawing Sheets

HYBRID VEHICLE

BACKGROUND OF THE INVENTION

1. Field of the Invention

The present invention relates to a hybrid vehicle, and more particularly to a parallel hybrid vehicle.

2. Description of the Related Art

Generally known parallel hybrid vehicles have an internal combustion engine as a primary propulsive power unit and an electric motor, more accurately a generator motor which can also operate as an electric generator, for generating an assistive output power for assisting the output power produced by the engine. The output powers (mechanical powers) generated by the engine and the generator motor are transmitted through a transmission to drive wheels of the hybrid vehicle.

For accelerating the hybrid vehicle, the generator motor is controlled to generate an assistive output power, and both the output power produced by the engine and the assistive output power from the generator motor are transmitted to the drive wheels. Therefore, the power requirements for accelerating the hybrid vehicle can be met, and the output power produced by the engine may be relatively small, thus reducing fuel consumption by the engine and exhaust gases emitted from the engine.

When the engine is idling while the hybrid vehicle is not running or when the output power produced by the engine does not need to be assisted while the hybrid vehicle is running, e.g., while the hybrid vehicle is cruising, the output power produced by the engine is wholly or partly used to cause the generator motor to operate in a regenerative mode, and the electric energy generated by the generator motor is stored in an electric energy storage unit such as a battery used as a power supply for the electric energy.

On the hybrid vehicle, it is necessary to supply electric energy to various accessories including an ignition system for the engine, an air-conditioning system and an audio system on the hybrid vehicle, a controller for controlling the generator motor, and other electric components. The voltage at which to energize these accessories is lower than the voltage at which the generator motor is operated. Therefore, the voltage of the electric energy generated by the generator motor and the voltage of the electric energy stored in the electric energy storage unit are lowered from 100–180 V to about 12 V by a DC to DC converter, and the electric energy of the lowered voltage is supplied to the accessories and also stored in a battery for the accessories for subsequent usage by the accessories.

The DC to DC converter, however, lowers the efficiency with which to generate the 12 V electric energy based on the electric energy generated by the generator motor, to 40%–60%. One solution would be to use a 12 V electric generator for generating and supplying 12 V electric energy to the accessories and also storing the 12 V electric energy in the battery for the accessories, so that the efficiency with which to generate the 12 V electric energy will be increased by not lowering the voltage of the electric energy generated by the generator motor to 12 V. However, the 12 V electric generator used in addition to the generator motor would require some means, e.g., a pulley and belt mechanism or a system of gears, for transmitting kinetic energy from the engine, the generator motor, and the drive wheels to the 12 V electric generator. As a result, the overall arrangement of the hybrid vehicle would be complicated in structure and increased in size.

On some hybrid vehicles, the output shaft of the engine and the rotatable shaft of the generator motor coaxially coupled to each other at all times. The generator motor regenerates electric energy with the output power from the engine based on the rotation transmitted directly from the output shaft of the engine, and assistive output power from the generator motor is transmitted directly to the output shaft of the engine.

On these hybrid vehicles, the generator motor regenerates electric energy highly efficiently when the rotational speed of the rotatable shaft of the generator motor ranges from 2000 to 3000 rpm. However, while the hybrid vehicle is being normally driven, the most frequently used range of rotational speeds of the engine is from 600 to 1800 rpm, and while the engine is idling, its rotational speed is 400 rpm in a vibration-reducing control mode in which the generator motor regenerates electric energy and produces output power alternately depending on torque fluctuations of the engine. Therefore, the usual range of rotational speeds of the engine is lower than the range of rotational speeds of the generator motor for highly efficient electric regeneration. Because the output shaft of the engine and the rotatable shaft of the generator motor coaxially coupled to each other at all times, the generator motor not only fails to regenerate electric energy highly efficiently, but also dissipates a large amount of heat due to the electric regeneration and the engine output power assistance that are affected in the less efficient rotational speed range. Furthermore, the fuel consumption by the engine is increased when the vibration-reducing control mode is carried out in the less efficient rotational speed range.

The assistive output power generated by the generator motor is transmitted, without being amplified, to the output shaft of the engine. Consequently, if a relatively large assistive output power is required for starting or accelerating the hybrid vehicle, the generator motor has to be relatively large in size and hence in weight.

SUMMARY OF THE INVENTION

It is therefore an object of the present invention to provide a hybrid vehicle which has a relative compact arrangement even with a generator for accessories being employed in addition to a generator motor, and which allows the generator motor to regenerate electric energy efficiently.

To achieve the above object, there is provided in accordance with the present invention a hybrid vehicle comprising an engine for propelling the hybrid vehicle, the engine having an output shaft, a generator motor coupled to the output shaft of the engine through a transfer shaft, for transmitting an assistive output power for assisting an output power of the engine through the transfer shaft to the output shaft of the engine, electric energy storage means for storing electric energy regenerated by the generator motor from kinetic energy of the hybrid vehicle transmitted from the output shaft of the engine through the transfer shaft, and a generator mounted on the transfer shaft and having an electric energy generating ability smaller than the generator motor, for generating electric energy to energize another device than the electric energy storage means.

Since the generator is mounted on the transfer shaft, the kinetic energy of the hybrid vehicle is transmitted directly to the generator motor and the generator for generating electric energy, so that the generator motor and the generator are put together as a compact assembly without any transfer mechanism such as a pulley and belt mechanism or a system of gears being incorporated therein.

The generator has an electric energy generating ability smaller than the generator motor and generates electric energy to energize the other device than the electric energy storage means. Specifically, the generator comprises an accessory energizing generator for generating electric energy to energize the accessory. The accessory may be an ignition system for the engine, a controller for controlling the generator motor, an air-conditioning system and an audio system on the hybrid vehicle, or a battery for accessories. The generator can generate electric energy to be supplied to the accessory with an efficiency greater than if electric energy were supplied from the generator motor through a DC to DC converter to the accessory.

The generator motor comprises a magnet generator motor having permanent magnets, the generator motor having clutch means for selectively connecting and disconnecting the output shaft of the engine and the transfer shaft, and the hybrid vehicle further comprises clutch control means for disengaging the clutch means to disconnect the transfer shaft from the output shaft of the engine when the generator motor does not need to produce the assistive output power and regenerate the electric energy.

Generator motors of the kind described may be a field-current generator motor or a magnet generator motor. The field-current generator motor is relatively large in size because electromagnetic coils on a rotor need to be supplied with currents through contacts to generate magnetic forces. Furthermore, while the field-current generator motor can normally achieve a generation efficiency ranging from 70 to 80%, the generation efficiency may drop to 50 to 60% due to a copper loss or an iron loss caused by its own heat or external loss. On the other hand, since the magnet generator motor has permanent magnets, it is does not need to be supplied with a current for generating electric energy, generates less heat than the field-current generator motor, and has a high generation efficiency. If the magnet generator motor has permanent magnets on its rotor, it may be small in size because no structure is required to supply currents to coils on the rotor through contacts. In view of these advantages, according to the present invention, the generator motor comprises a magnet generator motor for a higher generation efficiency and a smaller size.

Even when the magnet generator motor does not need to regenerate electric energy or produce an assistive output power, the magnetic forces produced by the permanent magnets apply resistive forces to the rotor at all times. Therefore, the resistance caused by the magnetic forces to the rotor of the magnet generator motor developed a loss in the output power of the engine, resulting in poor fuel consumption by the engine.

According to the present invention, the clutch means may be disengaged by the clutch control means when the generator motor does not need to produce the assistive output power and regenerate the electric energy. When the clutch means is disengaged, a rotational resistance caused by the generator motor is not applied to the engine, thus preventing the engine from suffering a wasteful fuel consumption.

The generator comprises a magnet generator having permanent magnets, the generator having clutch means for selectively connecting and disconnecting the output shaft of the engine and the transfer shaft, and the hybrid vehicle further comprises clutch control means for disengaging the clutch means to disconnect the transfer shaft from the output shaft of the engine when the generator does not need to generate the electric energy.

When the generator does not need to generate the electric energy, i.e., when the generator does not regenerate electric energy with the output power transmitted from the engine, the clutch control means disengages the clutch. Since the generator comprises a magnet generator, its rotor suffers a rotational resistance owing to magnetic forces of the permanent magnets. However, because the clutch means disconnects the generator from the output shaft of the engine, a rotational resistance caused by the generator is not applied to the engine, thus preventing the engine from suffering a wasteful fuel consumption.

The hybrid vehicle further comprises transfer means disposed between the output shaft of the engine and the transfer shaft, for varying a rotational speed of the output shaft of the engine to achieve a predetermined efficiency with which to regenerate electric energy with the generator motor, and transmitting rotation at the varied rotational speed from the output shaft of the engine to the generator motor. Even if the rotational speed of the output shaft of the engine is not a rotational speed to achieve a predetermined efficiency with which to regenerate electric energy with the generator motor, the transfer means varies the rotational speed of the output shaft of the engine to achieve the predetermined efficiency and transmits the rotation at the varied rotational speed from the output shaft of the engine to the generator motor. Therefore, the generator motor can regenerate electric energy highly efficiently.

The transfer means comprises means for increasing the rotational speed of the output shaft of the engine two through four times and transmitting rotation at the increased rotational speed from the output shaft of the engine to the generator motor.

Generally, the engine frequently rotates in a rotational speed range from 600 to 1800 rpm, and the generator has a good regeneration efficiency in a rotational speed range from about 2000 to about 3000 rpm. For this reason, the transfer means should preferably have a speed increase ratio ranging from 2 to 4. Inasmuch as the rotational speed of the output shaft of the engine two through four times is increased two through four times, and the rotation at the increased rotational speed is transmitted from the output shaft of the engine to the generator motor, the generator motor can regenerate electric energy highly efficiently.

The transfer means comprises a variable transmission mechanism for varying the rotational speed of the output shaft of the engine at a variable ratio and transmitting rotation at the varied rotational speed from the output shaft of the engine to the generator motor, the variable transmission mechanism comprising means for varying the rotational speed of the output shaft of the engine to achieve the predetermined efficiency with which to regenerate electric energy with the generator motor, depending on the rotational speed from the output shaft of the engine. The variable transmission mechanism varies the rotational speed of the output shaft of the engine depending on the rotational speed from the output shaft of the engine. Consequently, even if the rotational speed of the output shaft of the engine changes while the hybrid vehicle is running, since the variable transmission mechanism varies the rotational speed of the output shaft of the engine to a rotational speed range to achieve the predetermined efficiency with which to regenerate electric energy with the generator motor. As a result, the generator motor can regenerate electric energy highly efficiently.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
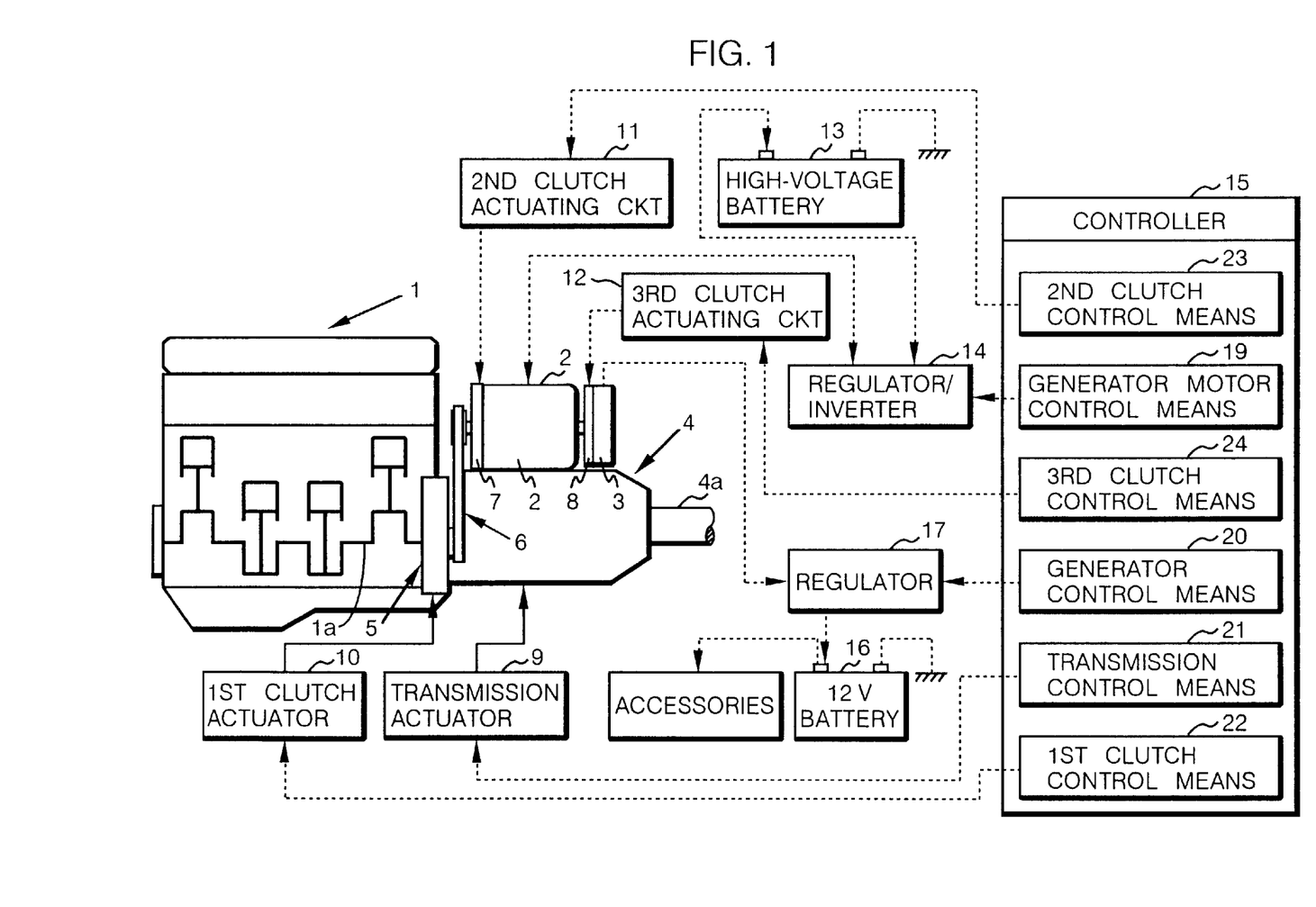
FIG. 1 is a block diagram of a system arrangement of a hybrid vehicle according to an embodiment of the present invention.

As shown in FIG. 1, a hybrid vehicle according to an embodiment of the present invention has a internal combustion engine 1, a generator motor 2, a generator 3, and a transmission 4. The engine 1 has a crankshaft 1a as an output shaft coupled through a first clutch mechanism 5 coaxially to an input shaft of the transmission 4 whose output drive shaft 4a is operatively connected to drive wheels of the hybrid vehicle through a differential gear mechanism (not shown). The generator motor 2 and the generator 3 are operatively coupled to the input shaft of the transmission 4 by a rotation transfer means 6. The rotation transfer means 6 increases the rotational speed of the output shaft of the engine 1 about three times, and transfers the rotation with increased rotational speed to the generator motor 2 and the generator 3. The rotation transfer means 6 comprises a large-diameter drive pulley fixed coaxially to the output shaft of the engine 1, a small-diameter driven pulley fixed coaxially to a transfer shaft 6a (see FIG. 2) common to the generator motor 2 and the generator 3, and an endless belt trained around the large-diameter drive pulley and the small-diameter driven pulley. The generator motor 2 and the generator 3 are mounted as a compact unit in an empty space available on an upper surface of a housing of the transmission 4.

Figure 2:
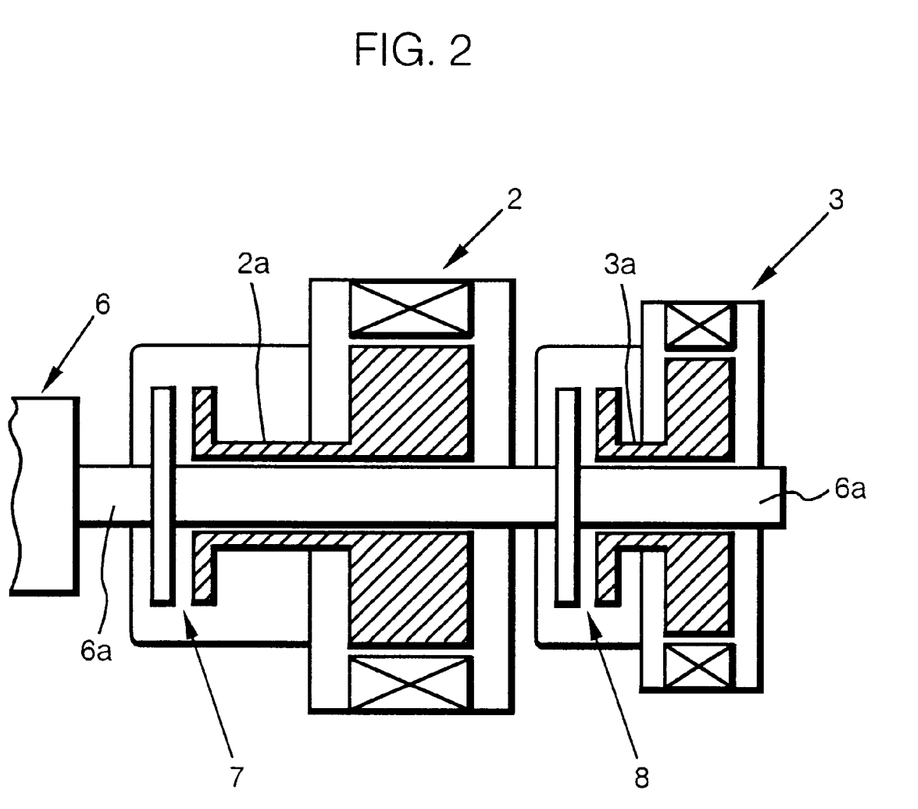
FIG. 2 is a schematic cross-sectional view of a generator motor and a generator on the hybrid vehicle shown in FIG. 1.

As shown in FIG. 2, the generator motor 2 has a rotatable shaft 2a has a second clutch mechanism 7 for selectively engaging and disengaging from the transfer shaft 6a extending from the rotation transfer means 6. The generator 3 has a rotatable shaft 3a disconnect ably coupled through a third clutch mechanism 8 to the transfer shaft 6a. The transfer shaft 6a extends coaxially through and interconnects the generator motor 2 and the generator 3, so that the generator motor 2 and the generator 3 are put together as a compact assembly without any transfer mechanism such as a pulley and belt mechanism or a system of gears being incorporated therein. The generator motor 2 comprises a magnet generator motor having permanent magnets which is capable of generating a voltage ranging from 100 to 180 V. The generator 3 also comprises a magnet generator motor having permanent magnets which is capable of generating a voltage ranging from 14 to 15 V. Since these magnet generator motors have their permanent magnets mounted on their rotors, they do not need any contacts and are relatively small in size.

As shown in FIG. 2, the generator 3 is connected behind the generator motor 2 as viewed from the transfer means 2. The transfer shaft 6a of the transfer means 6 extends through the rotatable shaft 2a of the generator motor 2, and also through the rotatable shaft 3a of the generator 3. The portion of the transfer shaft 6a which extends behind the generator motor 2 may be only strong enough to transfer the rotation of the generator motor 2 to the rotatable shaft 3a of the generator 3.

As shown in FIGS. 1 and 2, when the first clutch mechanism 5 and the second clutch mechanism 7 are engaged, the output power from the engine 1 is transferred through the transfer means 6 to the rotatable shaft 2a of the generator motor 2 and also to the rotatable shaft 3a of the generator 3. At this time, the output power from the engine 1 is also transmitted through the transmission 4 to the drive wheels of the hybrid vehicle, thereby propelling the hybrid vehicle. While the hybrid vehicle is running, when the generator motor 2 operates as an electric motor to generate an assistive output power for assisting the output power produced by the engine 1, the generated assistive output power is transmitted through the transmission 4 to the input shaft of the transmission 4. The assistive output power and the output power from the engine 1 are transmitted through the transmission 4 to the drive wheels.

The transmission 4 is operated to change its gear position by a transmission actuator 9 which comprises a hydraulic pump and a hydraulic circuit (not shown). Similarly, the first clutch mechanism 5 is operated for engagement and disengagement by a hydraulic clutch actuator 10. Each of the second clutch mechanism 7 of the generator motor 2 and the third clutch mechanism 8 of the generator 3 comprises an electrically controllable electromagnetic clutch. The second clutch mechanism 7 is selectively engageable and disengageable by a second clutch actuating circuit 11, and the third clutch mechanism 8 is selectively engageable and disengageable by a third clutch actuating circuit 12.

The first clutch mechanism 5 serves to connect and disconnect the engine 1 and the transmission 4. The second clutch mechanism 7 serves to connect and disconnect the engine 1 and the generator motor 2. The third clutch mechanism 8 serves to connect and disconnect the engine 1 and the generator 3.

The hybrid vehicle has, in addition to its mechanism arrangement described above, an electric arrangement described below.

The hybrid vehicle has a high-voltage battery 13 (electric energy storage means) which serves as a power supply for the generator motor 2 when it operates as the electric motor, a regulator/inverter 14 for transmitting electric energy between the high-voltage battery 13 and the generator motor 2, and a controller 15 comprising a microcomputer or the like. The hybrid vehicle also has a 12 V battery 16 for storing electric energy generated by the generator 3, and a regulator 17 for regulating the amount of electric energy generated by the generator 3. The 12 V battery 16 supplies electric energy to accessories 18 including an air-conditioning system (not shown) and an audio system (not shown) on the hybrid vehicle, and an ignition system for the engine 1, and also supplies an operating voltage to the controller 15.

The controller 15 is supplied with various data of a rotational speed of the engine 1, and energy storage states (remaining capacities) of the high-voltage battery 13 and the 12 V battery 16 from corresponding sensors (not shown).

The controller 15 has, as its functions, a generator motor control means 19 for controlling the generator motor 2 through the regulator/inverter 14, a generator control means 20 for controlling the generator 3 through the regulator 17, and a transmission control means 21 for controlling the transmission 3 through the transmission actuator 9. The controller 15 further includes a first clutch control means 22 for controlling the first clutch mechanism 5 through the first clutch actuator 10, a second clutch control means 23 for controlling the second clutch mechanism 7 through the second clutch actuating circuit 11, and a third clutch control means 24 for controlling the third clutch mechanism 8 through the third clutch actuating circuit 12. The second clutch control means 23 monitors the rotational speed of the generator motor 2 with a rotational speed sensor (not shown) which is combined with the generator motor 2 for detecting the rotational speed of the generator motor 2. In the event that the rotational speed of the generator motor 2 is excessively high, the second clutch control means 23 energizes the second clutch actuating circuit 11 to disengage the second clutch mechanism 7.

The generator 3 is also associated with a rotational speed sensor for detecting the rotational speed of the generator 3. The third clutch control means 24 monitors the rotational speed of the generator 3 with the rotational speed sensor. When the rotational speed of the generator 3 is excessively high, the third clutch control means 24 energizes the third clutch actuating circuit 12 to disengage the third clutch mechanism 8.

The generator motor control means 19 controls the regulator/inverter 14 to operate the generator motor 2 as an electric motor with electric energy supplied from the high-voltage battery 13 when the hybrid vehicle is accelerated, and also controls the regulator/inverter 14 to operate the generator motor 2 as an electric generator for generating electric energy to be stored in the high-voltage battery 13, i.e., to charge the high-voltage battery 13 when the hybrid vehicle is decelerated or cruising, i.e. running at a constant speed. The generator motor control means 19 controls the regulator/inverter 14 to operate the generator motor 2 as an electric generator and an electric motor at times depending on torque fluctuations of the engine 1 when the engine 1 is idling while the hybrid vehicle is being parked. This mode of operation of the generator motor 2 is referred to as a vibration-reducing control mode. The generator motor control means 19 includes a means for monitoring the rotational speed of the generator motor 2 with the rotational speed sensor combined therewith, and interrupting or inhibiting the generation of electric energy by the generator motor 2, as by cutting off the exciting current thereof, when the generator motor 2 excessively rotates.

The transmission control means 21 controls the transmission actuator 6 to operate the transmission 4 at a speed reduction ratio established depending running conditions of the hybrid vehicle.

The first clutch control means 22 controls the first clutch actuator 10 to disengage the first clutch mechanism 5 when the hybrid vehicle is decelerated, for example. If the first clutch mechanism 5 were engaged when the hybrid vehicle is decelerated, part of the kinetic energy of the hybrid vehicle would be consumed by engine braking of the engine 1. However, when the first clutch mechanism 5 disengaged (at this time, the second and third clutch mechanisms 7, 8 are engaged), a greater amount of the kinetic energy of the hybrid vehicle is transmitted from the drive wheels through the transmission 4 and the transfer means 6 to the generator motor 2 and the generator 3. Therefore, the efficiency with which the kinetic energy of the hybrid vehicle upon deceleration of the hybrid vehicle is converted into electric energy (regenerated electric power) by the generator motor 2 and the generator 3 is increased.

The second clutch control means 23 controls the second clutch actuating circuit 11 to disengage the second clutch mechanism 7 when the hybrid vehicle is decelerated or cruising, i.e. running at a constant speed. Specifically, as described later on, when the generator motor 2 does not need to regenerate electric energy or produce an assistive output power while the hybrid vehicle is cruising, for example, the second clutch control means 23 disengages the second clutch mechanism 7 (at this time, the first clutch mechanism 5 is engaged), a portion of the output power produced by the engine 1 is prevented from being consumed by a rotational resistance caused by the generator motor 2 due to the magnetic forces of the permanent magnets thereof. If the third clutch mechanism 3 is engaged at this time, then the generator 3 generates electric energy.

The third clutch control means 24 controls the third clutch actuating circuit 12 to disengage the third clutch mechanism 8. Specifically, if the generator 3 does not need to generate electric energy while the generator motor 2 is regenerating electric energy, then the third clutch control means 24 disengages the third clutch mechanism 8, thus preventing the electric energy regenerated by the generator motor 2 from being consumed by a rotational resistance caused by the generator 3 due to the magnetic forces of the permanent magnets thereof. Similarly, if the generator 3 does not need to generate electric energy while the generator motor 2 is producing an assistive output power, then the third clutch control means 24 disengages the third clutch mechanism 8, thus preventing the assistive output power produced by the generator motor 2 from being consumed by a rotational resistance caused by the generator 3.

In this embodiment, the generator 3 does not need to generate electric energy when the energy storage state (remaining capacity) of the 12 V battery 16 is sufficient and the load imposed by the accessories is very small. The controller 15 judges the load from the energy storage state (remaining capacity) of the 12 V battery 16, and determines the amount of electric energy to be generated for the 12 V battery 16 based on the judged load. Based on the determined amount of electric energy, the generator control means 20 controls the generator 3 through the regulator 17. If the determined amount of electric energy is very small, the third clutch control means 24 controls the third clutch actuating circuit 12 to disengage the third clutch mechanism 8.

When the second clutch mechanism 7 and the third clutch mechanism 8 are engaged, the transfer means 6 is connected to the generator motor 2 and the generator 3, so that the generator motor 2 regenerates electric energy or applies an assistive output power to the output shaft of the engine 1. At this time, the generator motor 2 and the generator 3 are rotated at a rotational speed that is three times the rotational speed of the engine 1.

Figure 3:
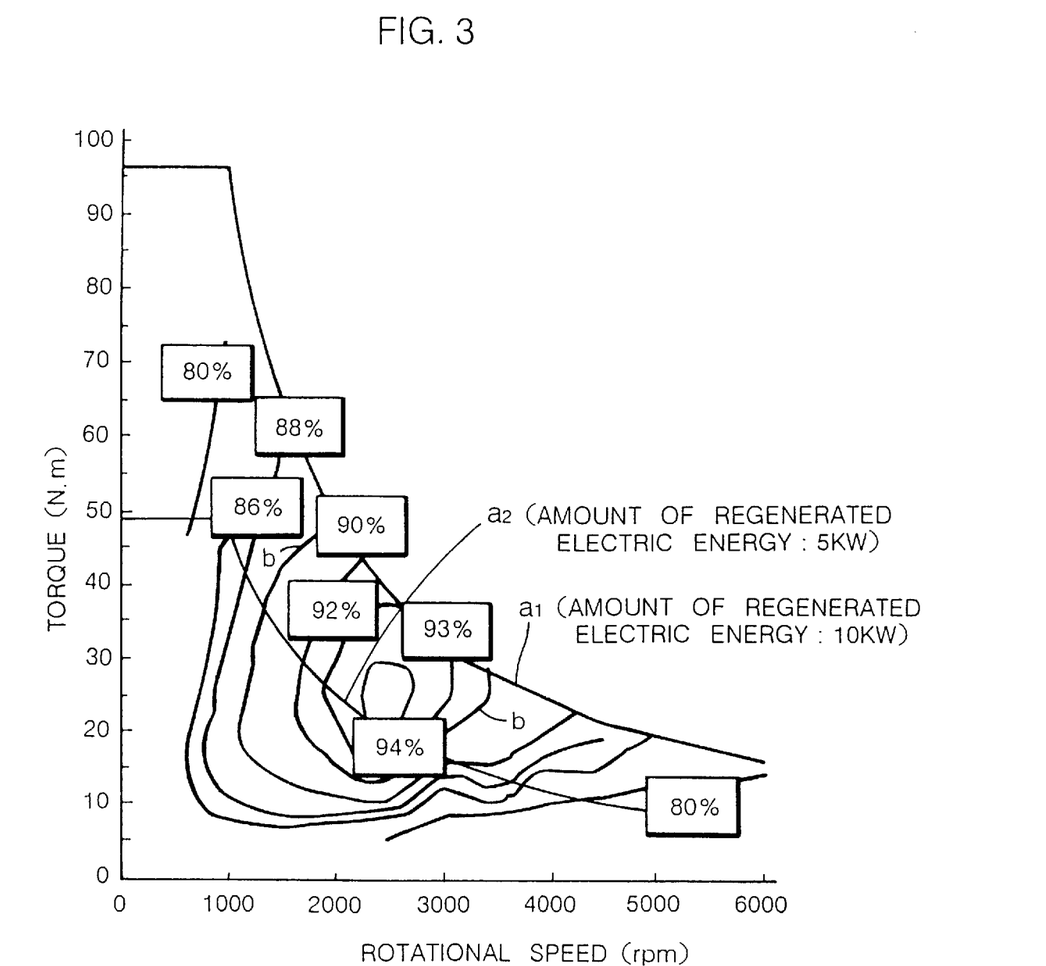
FIG. 3 is a diagram of operation characteristics of the generator motor, operating as an electric generator, on the hybrid vehicle shown in FIG. 1.
Figure 4:
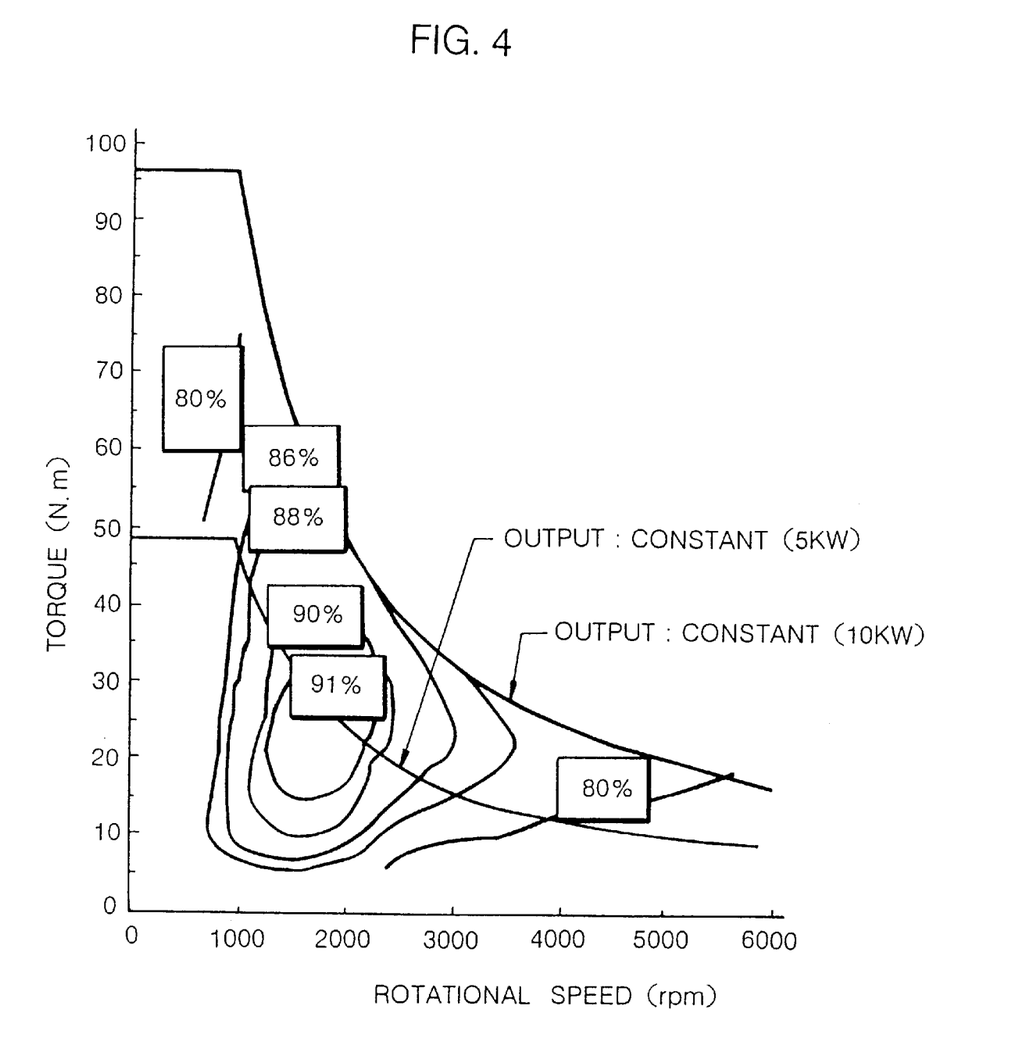
FIG. 4 is a diagram of operation characteristics of the generator motor, operating as an electric generator, on the hybrid vehicle shown in FIG. 1.

If the generator motor 2 regenerates electric energy under this condition, when the rotational speed of the output shaft of the engine 1 is 800 rpm, for example, the rotatable shaft of the generator motor 2 rotates at 2400 rpm. The rotational speed for the generator motor 2 to regenerate electric energy at highest efficiency will be described below with reference to FIG. 3. In FIG. 3, curves a1, a2 represent relationships between the rotational speed of the generator motor 2 and the torque thereof when the amount of electric energy regenerated by the generator motor 2 is 10 kW (constant) and 5 kW (constant), respectively, and a plurality of contour-line-like curves b are constant-efficiency curves (which represent operating points where the energy efficiency of the generator motor 2 is constant) of the generator motor 2. As shown in FIG. 3, if 10 kW is regenerated by the generator motor 2, for example, then the energy efficiency of the generator motor 2 is maximum (about 93%) when the rotational speed of the generator motor 2 is in the range from about 2000 to 3000 rpm. Therefore, if the rotational speed of the output shaft of the engine 1 is relatively low, then a large amount of electric energy can be outputted from the generator motor 2 and the generator 3.

When the generator motor 2 operates as an electric motor and the second clutch mechanism 7 is engaged, the torque of the rotational shaft 2a of the generator motor 2 is amplified by the transfer means 6 and transmitted to the input shaft of the transmission 4. Therefore, the assistive output power from the generator motor 2 can efficiently imparted to the engine 1 for reducing the fuel consumption by the engine 1. In addition, since the energy efficiency of the generator motor 2 is good at its rotational speed of about 2000 rpm, when the assistive output power is generated by the generator motor 2, the rotational speed of the generator motor 2 can be brought to a range from 1800 to 2100 rpm for good energy efficiency even if the rotational speed of the engine 1 is in a log range from 600 to 700 rpm.

For controlling the generator motor 2 in the vibration-reducing control mode when the engine 1 is idling, the engine 1 may rotate at a very low rotational speed of 400 rpm. Since, however, the generator motor 2 rotates at a relatively high rotational speed of 1200 rpm because of the speed increasing capability of the transfer means 5, the rotational speed of the generator motor 2 may be brought to a rotational speed range for good output power generation efficiency and energy efficiency when the engine 1 is idling. The generator motor 2 may thus be operated in the vibration-reducing control mode while reducing the fuel consumption by the engine 1.

In the illustrated embodiment, the transfer means 5 increases the rotational speed of the output shaft of the engine 1 three times for transmission to the generator motor 2 and the generator 3. However, insofar as the engine 1 frequently rotates in a rotational speed range from 600 to 1800 rpm, and the generator motor 2 and the generator 3 have a maximum limit rotational speed of about 20000 rpm, and the speed increase ratio of the transfer means 5 should be as high as possible in imparting the assistive output power of the generator motor 2 to the output shaft of the engine 1, the speed increase ratio of the transfer means 5 is preferably in the range from 2 to 4.

As shown in FIG. 2, the transfer shaft 6a of the transfer means 6 extends straight successively through the rotatable shaft 2a of the generator motor 2 and the rotatable shaft 3a of the generator 3, so that the generator motor 2 and the generator 3 are coaxially coupled to each other. However, the transfer shaft 6a may extend first through the rotatable shaft 3a of the generator 3 and then through the rotatable shaft 2a of the generator motor 2 positioned behind the generator 3.

Figure 5:
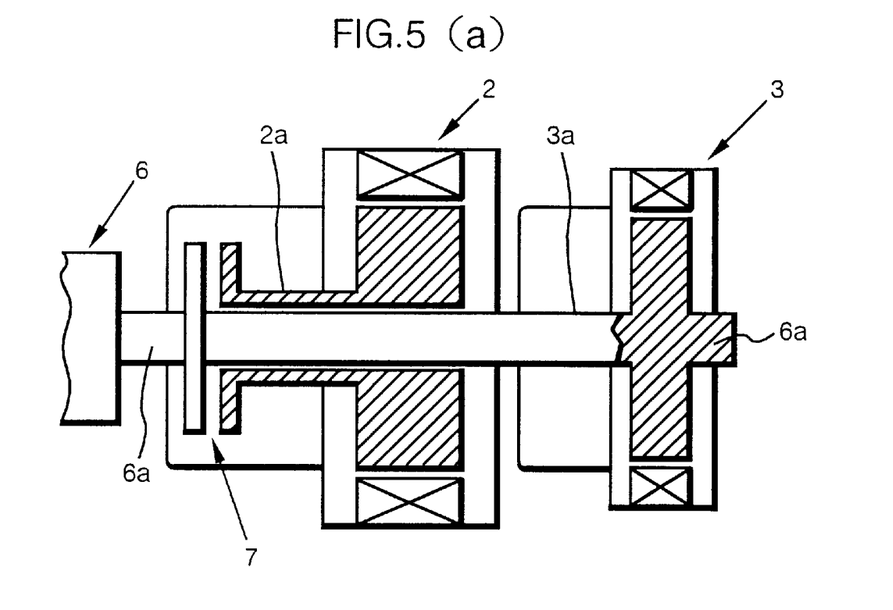
FIG. 5(a) is schematic cross-sectional view of a generator motor and a generator according to another embodiment of the present invention.
FIG. 5(b) is schematic cross-sectional view of a generator motor and a generator according to still another embodiment of the present invention.

FIG. 5(a) shows a generator motor 2 and a generator 3 according to another embodiment of the present invention. In FIG. 5(a), the rotatable shaft 3a of the generator 3 is integrally joined to the transfer shaft 6a of the transfer means 6, thus dispensing with the third clutch mechanism 8.

In FIG. 5(a), since the rotatable shaft 3a of the generator 3 is connected to the transfer shaft 6a of the transfer means 6 at all times, it is not possible to avoid a rotational resistance caused by the generator motor 2 due to the magnetic forces of the permanent magnets thereof, but the overall arrangement is simplified and hence its cost is reduced because the third clutch actuating circuit 12 may be dispensed with and the third clutch control means 24 in the controller 15 may also be dispensed with.

FIG. 5(b) shows a generator motor 2 and a generator 3 according to still another embodiment of the present invention. In FIG. 5(b), the generator motor 2 is positioned behind the generator 3, and the transfer shaft 6a which is integrally joined to the rotational shaft 3a extends through the rotational shaft 2a of the generator motor 2.

In the above embodiments, the transfer means 6 is disposed between the first clutch mechanism 5 and the transmission 4, and the generator motor 2 is connected to the transfer means 6 through the second clutch mechanism 7. However, the transfer means 6 may be dispensed with, and the generator motor 2 and the generator 3 that are coaxially coupled to each other may be disposed between the first clutch mechanism 5 and the transmission 4. Specifically, the rotational shaft 2a of the generator motor 2 and the rotational shaft 3a of the motor 3 may be connected respectively through the second and third clutch mechanisms 7, 8 to the output shaft of the engine 1 which extends from the crankshaft 1a through the first clutch mechanism 5 to the transmission 5. With this modification, when the generator motor 2 does not need to regenerate electric energy and to produce an assistive output power, the generator motor 2 can be disconnected from the output shaft of the engine 1 by the second clutch mechanism 7 to isolate a rotational resistance caused by the generator motor 2, and when the generator 3 does not need to generate electric energy, the generator 3 can be disconnected from the output shaft of the engine 1 by the third clutch mechanism 8 to isolate a rotational resistance caused by the generator 3.

In the embodiment shown in FIG. 1, the transfer means 6 comprises the large-diameter drive pulley fixed coaxially to the output shaft of the engine 1, the small-diameter driven pulley fixed coaxially to the transfer shaft 6a, and the endless belt trained around the large-diameter drive pulley and the small-diameter driven pulley for increasing the rotational speed of the output shaft of the engine 1 three times for transmission to the generator motor 2 and the generator 3. However, the transfer means 6 may comprise a mechanism with a variable speed increase ratio.

Figure 6:
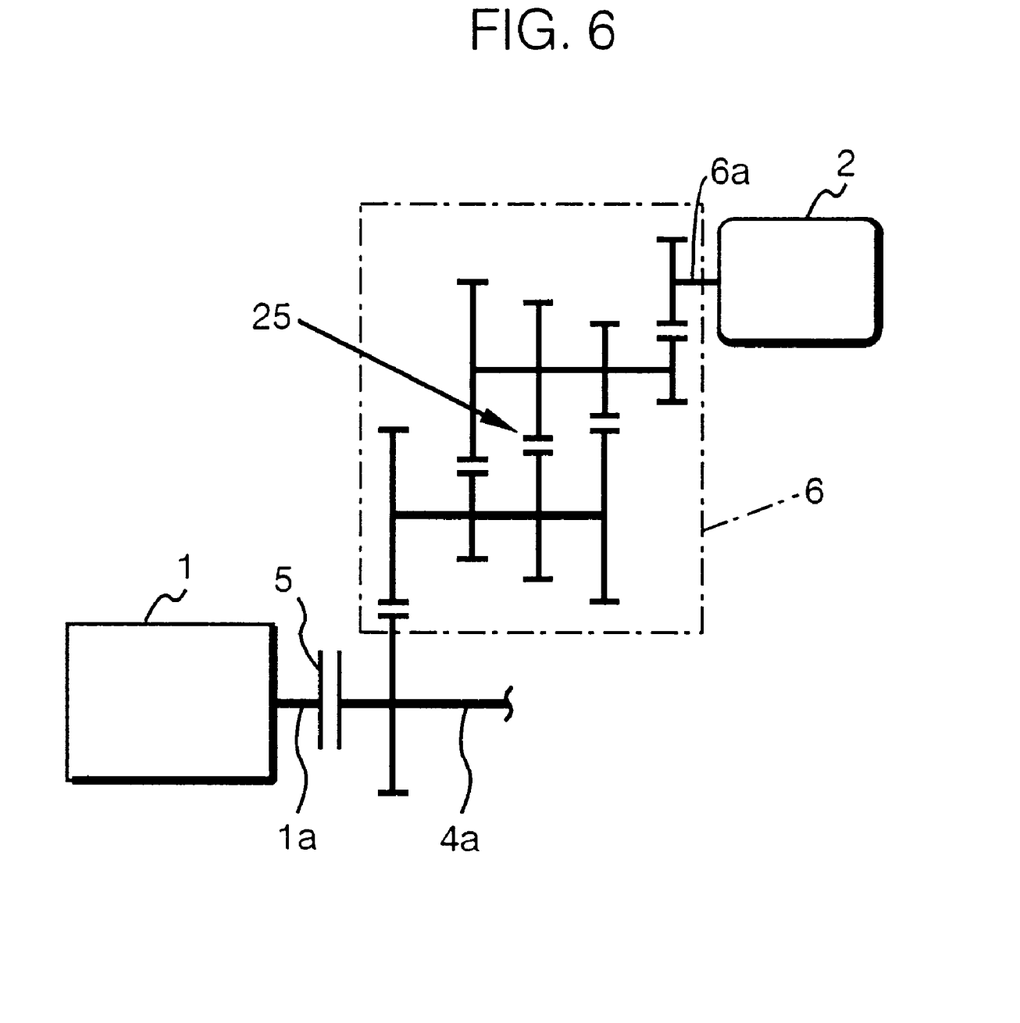
FIG. 6 is a schematic view of a transfer means according to another embodiment of the present invention.

FIG. 6 shows a transfer means 6 according to another embodiment of the present invention. In FIG. 6, the transfer means 6 has a variable transmission mechanism 25 comprising a train of gears, which can be operated by a transmission actuator (not shown) to vary a speed increase ratio depending on the rotational speed of the output shaft of the engine 1.

Figure 7:
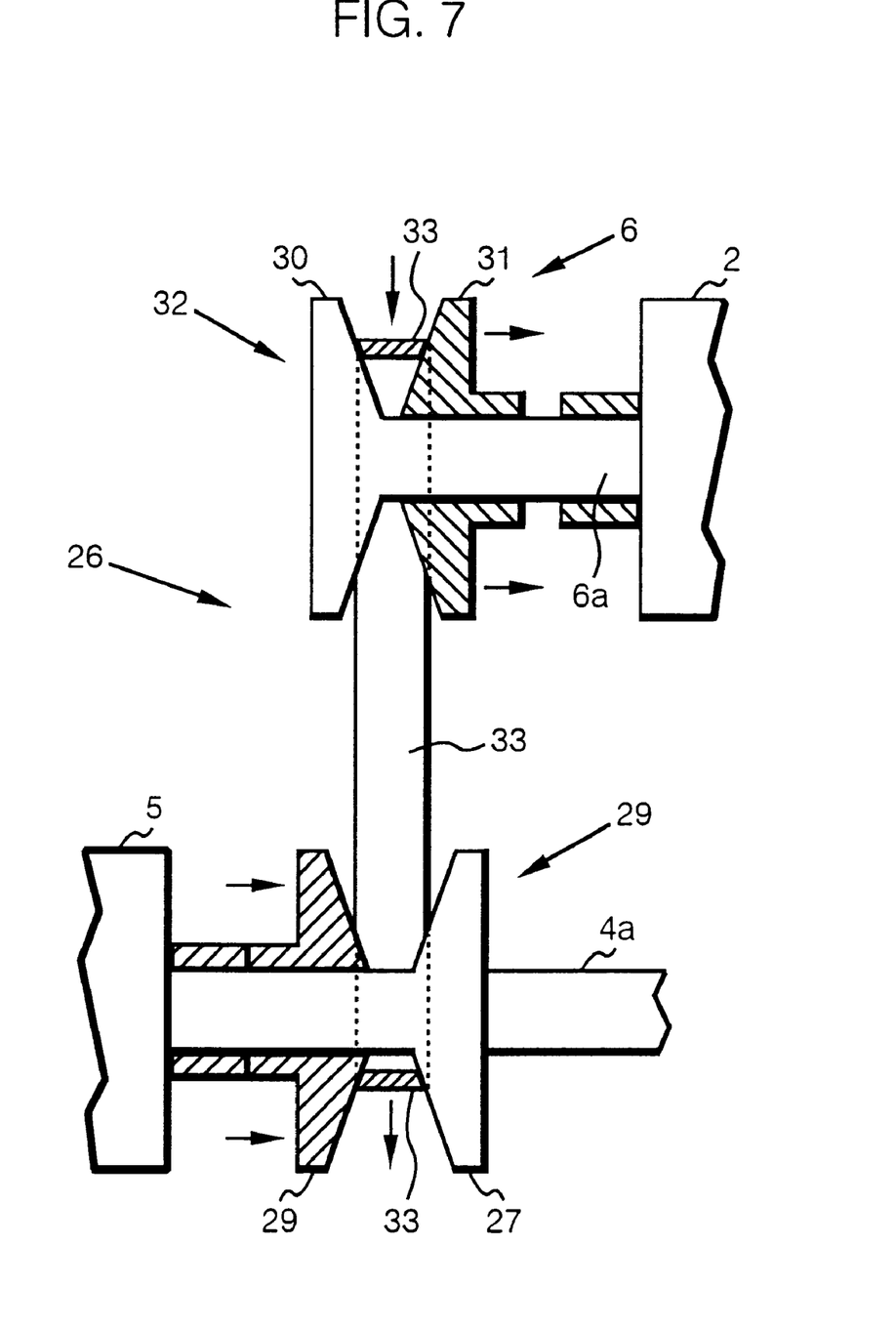
FIG. 7 is a schematic cross-sectional view of a transfer means according to still another embodiment of the present invention.

FIG. 7 shows a transfer means 6 according to still another embodiment of the present invention. In FIG. 7, the transfer means 6 has a continuously variable transmission mechanism 26. The continuously variable transmission mechanism 26 comprises a first pulley 29 coaxially coupled to the output shaft of the engine 1 and comprising a fixed cone 27 and a movable cone 28, a second pulley 32 coaxially coupled to the transfer shaft 6a connected to the generator motor 2 and comprising a fixed cone 30 and a movable cone 31, and an endless belt 33 trained around the first pulley 29 and the second pulley 32. When the rotational speed of the output shaft of the engine 1 is relatively high, the movable cone 28 of the first pulley 29 is axially displaced away from the fixed cone 27 thereof to reduce the circumferential length of the first pulley 29 around which the endless belt 33 runs, and the movable cone 31 of the second pulley 32 is axially displaced toward the fixed cone 30 thereof to increase the circumferential length of the second pulley 32 around which the endless belt 33 runs, for thereby reducing the speed increase ratio of the transfer means 6. Conversely, when the rotational speed of the output shaft of the engine 1 is relatively low, the movable cone 28 of the first pulley 29 is axially displaced toward the fixed cone 27 thereof to increase the circumferential length of the first pulley 29 around which the endless belt 33 runs, and the movable cone 31 of the second pulley 32 is axially displaced away from the fixed cone 30 thereof to reduce the circumferential length of the second pulley 32 around which the endless belt 33 runs, for thereby increasing the speed increase ratio of the transfer means 6. In this manner, the speed increase ratio of the transfer means 6 can be varied for transmission of the rotation from the engine 1 to the generator motor 2 depending on the rotational speed of the output shaft of the engine 1, for thereby achieving a rotational speed optimum for the generator motor 2 to regenerate electric energy and produce an assistive output power and also for the generator 3 to generate electric energy.

Although certain preferred embodiments of the present invention have been shown and described in detail, it should be understood that various changes and modifications may be made therein without departing from the scope of the appended claims.

What is claimed is:

1. A hybrid vehicle comprising:

an engine for propelling the hybrid vehicle, said engine having an output shaft;

a generator motor mounted on a transfer shaft and coupled to said output shaft of the engine through said transfer shaft, for transmitting an assitive output power for assisting an output power of said engine through said transfer shaft to the output shaft of the engine;

electric energy storage means for storing electric energy regenerated by said generator motor from kinetic energy of the hybrid vehicle transmitted from said output shaft of the engine through said transfer shaft; and a generator mounted on said transfer shaft and having an electric generating ability smaller than said generator motor, for generating electric energy to energize another device than said electric energy storage means.

2. A hybrid vehicle according to claim 1, wherein said other device comprises an accessory on the hybrid vehicle, said generator comprising an accessory energizing generator for generating electric energy to energize said accessory.

3. A hybrid vehicle according to claim 1, wherein said generator motor comprises a magnet generator motor having permanent magnets, said generator motor having clutch means for selectively connecting and disconnecting said output shaft of the engine and said transfer shaft, and said hybrid vehicle further comprising clutch control means for disengaging said clutch means to disconnect said transfer shaft from said output shaft of the engine when said generator motor does not need to produce the assistive output power and regenerate the electric energy.

4. A hybrid vehicle according to claim 1, wherein said generator comprises a magnet generator having permanent magnets, said generator having clutch means for selectively connecting and disconnecting said output shaft of the engine and said transfer shaft, and said hybrid vehicle further comprising clutch control means for disengaging said clutch means to disconnect said transfer shaft from said output shaft of the engine when said generator does not need to generate the electric energy.

5. A hybrid vehicle according to claim 1, further comprising transfer means disposed between said output shaft of the engine and said transfer shaft, for varying a rotational speed of the output shaft of the engine to achieve a predetermined efficiency with which to regenerate electric energy with said generator motor, and transmitting rotation at the varied rotational speed from the output shaft of the engine to said generator motor.

6. A hybrid vehicle according to claim 5, wherein said transfer means comprises means for increasing the rotational speed of the output shaft of the engine two through four times and transmitting rotation at the increased rotational speed from the output shaft of the engine to said generator motor.

7. A hybrid vehicle according to claim 5, wherein said transfer means comprises a variable transmission mechanism for varying the rotational speed of the output shaft of the engine at a variable ratio and transmitting rotation at the varied rotational speed from the output shaft of the engine to said generator motor, said variable transmission mechanism comprising means for varying the rotational speed of the output shaft of the engine to achieve said predetermined efficiency with which to regenerate electric energy with said generator motor, depending on the rotational speed from the output shaft of the engine.

8. A hybrid vehicle according to claim 1, wherein said generator motor comprises a magnet generator motor having permanent magnets, said generator motor having clutch means for selectively connecting and disconnecting said output shaft of the engine and said transfer shaft, and said hybrid vehicle further comprising clutch control means for engaging said clutch means to connect said transfer shaft to said output shaft of the engine when the assitive output power is produced by said generator motor, and for disengaging said clutch means to disconnect said transfer shaft from said output shaft of the engine when the electric energy is regenerated by said generator motor.

* * * * *